J. HOPKINSON.
LAST SLICE HOLDER.
APPLICATION FILED AUG. 6, 1915.
1,223,879.
Patented Apr. 24, 1917.
2 SHEETS—SHEET 1.
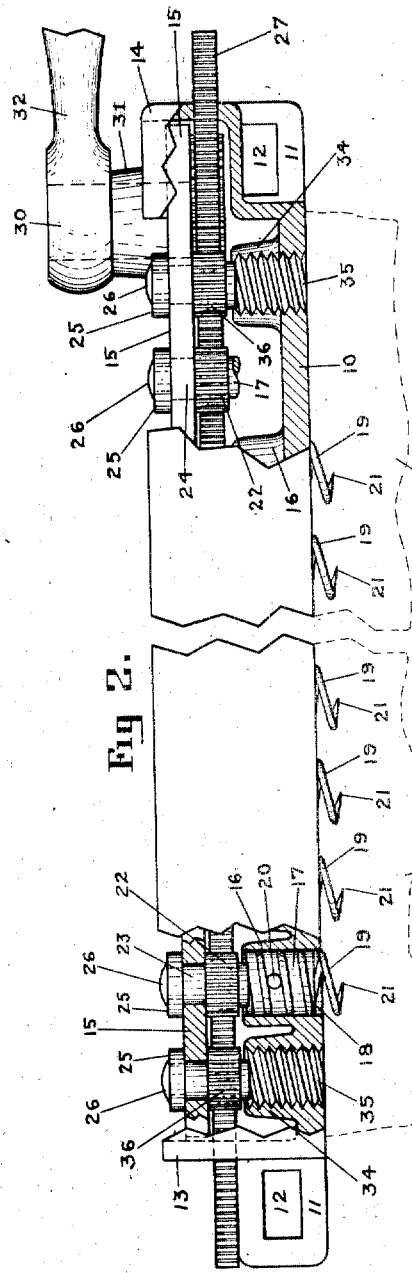
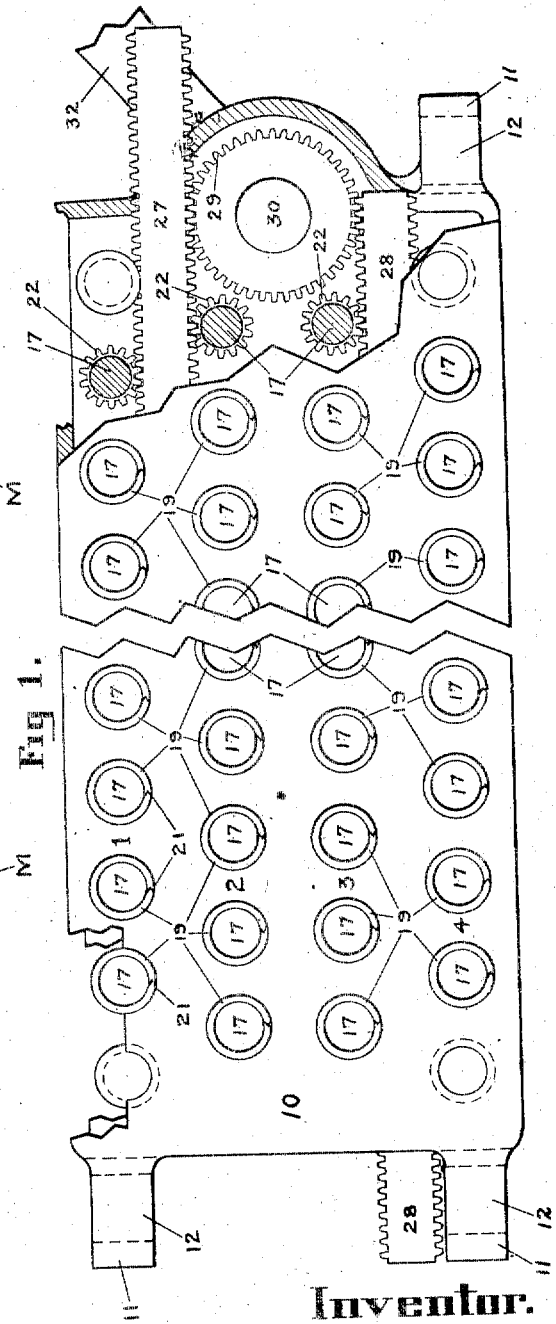
Inventor.
Joseph Hopkinson
Kerr Page Cooper + Hayward
Attys J. HOPKINSON.
LAST SLICE HOLDER.
APPLICATION FILED AUG. 6, 1915.
1,223,879.
Patented Apr. 24, 1917
2 SHEETS—SHEET 2.
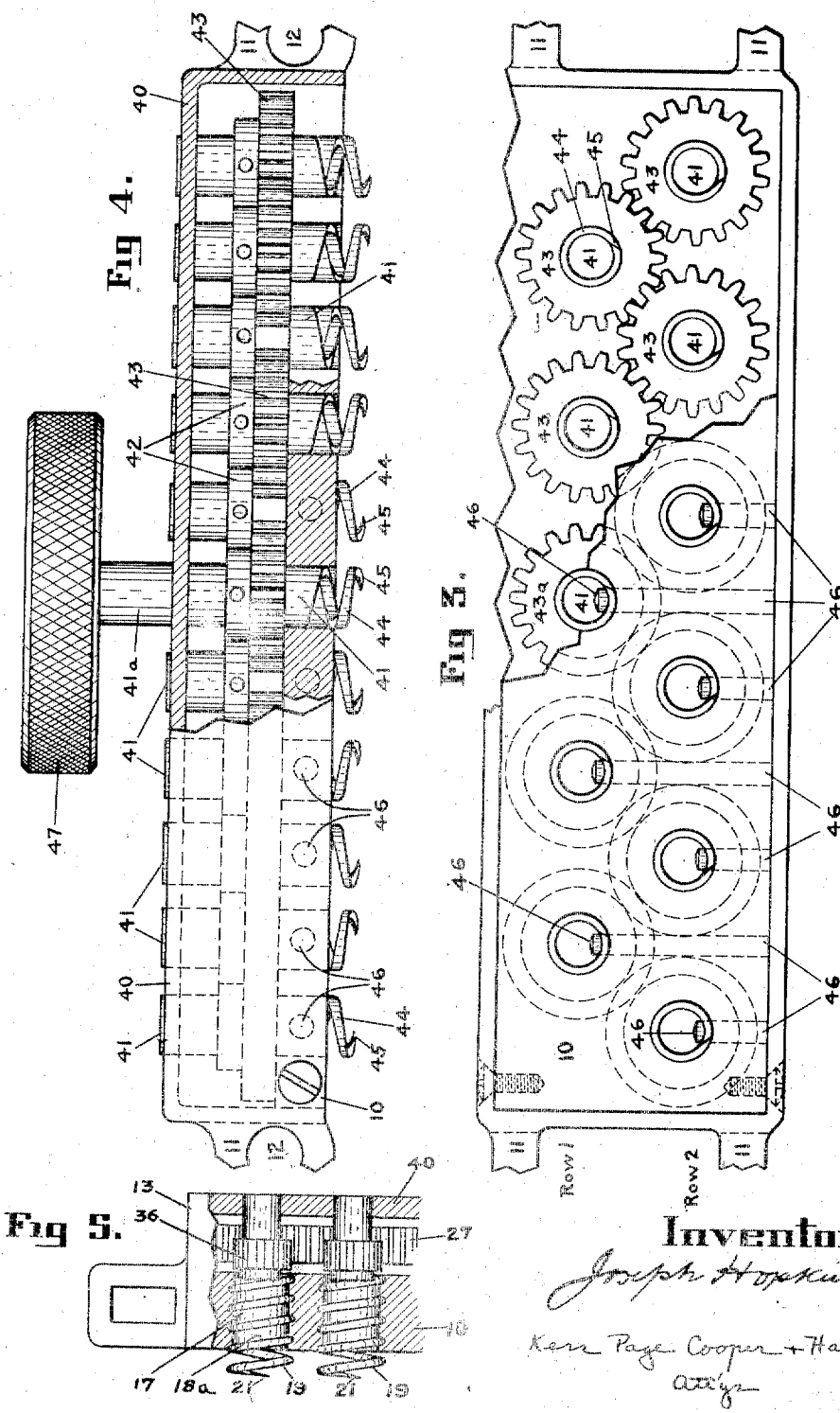
Inventor.
Joseph Hopkinson
Kerr Page Cooper + Hayward
Attys

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

LAST-SLICE HOLDER.

1,223,879.

Specification of Letters Patent.

Patented Apr. 24, 1917.

Application filed August 6, 1915. Serial No. 43,914.

*To all whom it may concern:*

Be it known that I, JOSEPH HOPKINSON, a citizen of the United States, residing at Dayton, Montgomery county, and State of Ohio, have invented certain new and useful Improvements in Last-Slice Holders, of which the following is a full, clear, and exact description.

This invention relates to certain new and useful improvements in attachments for meat slicing machines, and is particularly related to an improved meat holder for such machines. My improved meat holder is particularly adapted for use on meat slicers when cutting the "last slice". Such devices are generally known as "last slice" holders or meat end holders and are substituted for the ordinary meat holders when butt ends of dried beef, sausage or bacon are to be sliced. The last slice holders grip the meat securely and allow the slicing machine to cut down to a very short distance from the end of the piece of meat. The use of last slice holders effects a considerable economy to the user of a slicing machine, since it allows small pieces of meat to be sliced which ordinarily would be scrapped.

My device consists in certain improvements which permit the meat to be quickly placed upon the holder and after the meat is once in place it is securely held and prevented from accidentally slipping from position. In my improved holder the points of the meat retaining hooks or tangs are normally below the surface of the plate. This prevents the operator injuring his hands in placing the holder in position. After the holder is in position and during the meat clamping operation, the tangs advance beyond the plane of the plate and grip the meat.

In the drawings—

Figure 1 shows in elevation the preferred embodiment of my improved form of last slice holder.

Fig. 2 shows a top view partly in section of the holder shown in Fig. 1. Certain parts are broken away to show the parts beneath.

Fig. 3 shows in elevation a modified construction in which the tangs are integral with the carrying studs.

Fig. 4 shows a top plan view of the holder shown in Fig. 3, certain parts being shown in section.

Fig. 5 shows a modified method of attaching the tangs to the carrying studs.

Referring to Fig. 1: 10 is the meat plate; projecting from the ends of this plate are ears 11, which are provided with apertures 12. In placing the meat plate in position on the slicing machine posts on the machine engage these apertures in the ears and hold the plate in proper position. Projecting rearwardly from the plate are extensions 13 and 14. These extensions serve as supports and guides for carrying the plate 15 which carries the operating mechanism.

Extending rearwardly from the meat plate are a number of bosses 16. These bosses are drilled and serve as supports for the carrying studs which are shown at 17. There is one boss 16 for each carrying stud 17. It will be seen in Fig. 1 that the studs 17 are located in the plate in staggered relation to one another. Row 1 of studs is staggered with respect to row 2, and row 3 is staggered with respect to row 4. Rows 2 and 3 are in alinement with each other. Each carrying stud is spirally slotted on its periphery, as shown at 18. These spiral slots receive spiral meat tangs 19. These tangs are formed of spring wire and are screwed into place in the carrying studs before the studs are placed in position in the plate. After the spiral tang is in place a taper pin 20 is driven into a hole in the stud and the sides of the pin contact with adjoining convolutions of the tang 19 and hold the tang securely in position in the slot 18. The end of the tangs when the tangs are secured in position extend a slight distance beyond the end of the carrying studs. These ends 21 of the tangs are sharpened to a point so that the tangs easily perforate the meat.

The rear ends of the studs are diminished in diameter and each stud carries a pinion 22. These pinions may be integral with the studs or they may be pinned thereon. In any case they are made smaller than the diameter of the hole in the boss, so that they will pass through the hole in assembling. The studs 17 extend beyond the pinions 22 as shown at 23, and this portion of the studs is journaled in holes 24 in the carrying plate 15. After the studs are inserted they are retained by means of collars 25, which are held in position by screws 26. If desired, the studs and the collars may be pinned together.

It will be understood that the pinions 22 of any one row of studs will be in alinement with one another. The teeth on these pinions mesh with teeth on the racks 27 and 28. These racks have teeth on their upper and lower sides. One rack 27 meshes with the pinions in rows 1 and 2 and the other rack 28 meshes with the pinions in rows 3 and 4. A large pinion 29 is secured to a stud 30, which is journaled in boss 31 on the carrying plate 15. This pinion 29 meshes with the teeth on racks 27 and 28, and when turned moves one rack 27 forward and the other rack 28 rearward. This movement of the racks causes a rotation of the carrying studs 17 and a corresponding rotation of the tangs 19. It will be seen that the tangs in row 1 rotate in an opposite direction from those in row 2 and the tangs in row 3 rotate in an opposite direction from those in row 4. The tangs are therefore mounted in the carrying studs in right and left hand spiral slots depending on the direction of rotation. The point of the tangs in each case is pointed in the direction of movement during the clamping of the meat. To rotate the pinion a rock handle 32 is attached to the end of stud 30. The racks 27 and 28 are supported between the upper and lower rows of pinions and the meat plate casing is broken away to allow the racks to pass therethrough.

In order to impart an advancing movement to the tangs 19, i. e., to cause relative movement between the points 21 of the tangs 19 and face of the meat plate 10, I provide the following mechanism: Bosses 34 are located on the rear sides of the meat plate 10 at the corners thereof. These bosses are drilled and internally screw threaded to receive threaded studs 35. These studs carry pinions 36 which mesh with racks 27 and 28, and are journaled in the carrying plate 15 and are provided with collars and screws in a similar manner to the tang carrying studs 17. In operating the handle a rotating motion is imparted to the threaded studs 35. These threaded studs move in and out in the threaded bosses and the in and out motion of the studs is transmitted to the carrying plate by the engagement of collars 25 and pinions 36 against the edges of said plate. The in and out movement of the carrying plate 15 in turn carries studs 17 in and out and thereby causes a relative movement of the points 21 of tangs 19 and the face of the meat plate 10.

It will be understood that when the parts are in normal position, the handle 32 is to the left (Fig. 1), plate 15 is in a position more remote from plate 10, as shown in Fig. 2, and the points 21 of tangs 19 are below the surface of plate 10. When the tangs are in this position, the slicer is easier to handle and more easily placed in position on the posts and accidents to the operator are prevented. When placing the meat on the holder the operator holds the meat against the meat plate and then gives the handle 32 a clockwise movement. This movement both advances and rotates the tangs. The adjoining rows of tangs move in opposite directions, and thereby they do not tend to crowd the meat along the face of the meat plate but instantly engage the meat and hold it securely to plate 10. In Fig. 2 the parts are shown in operative position and with a piece of meat secured to the advanced tangs. In this figure the meat is shown in dotted lines at M.

In slicing thin ends with this device, by giving the handle 32 a partial movement, it will be possible to only advance the points 21 of the tangs 19 a short distance beyond the face of the meat plate 10. In this way very thin ends may be secured to the holder and when thicker slices are applied a correspondingly greater movement may be applied to the handle 32. It will be understood that in all cases the degree or extent of rotation of the tangs 19 will be proportional to the extent of advancement of the tangs.

Fig. 5 shows a modification in which the spiral tangs themselves are used to cause a relative movement between the point 21 of the tangs and the face of the meat plate. In this construction the slots 18ᵃ in the carrying studs are made only of sufficient depth to receive one half of the spiral tang. The other half of the tang coöperates with a spiral slot which is cut in the meat plate. Consequently when the carrying stud 17 is rotated the spiral tang becomes a thread and advances the stud 17 and carries the point 21 of the tang away or toward the meat plate. In this construction the collars on the ends of the studs are omitted and the plate 40 is rigid with the extensions 13 and 14. The pinion 50 is similar to pinion 36 of Fig. 2, and this pinion and the carrying stud shift with respect to the plate 40, rack 27 and the front of meat plate 10.

Figs. 3 and 4 show a modified form of my improved last slice holders in which the tangs are integral with the carrying studs. In this construction the carrying or rear plate is rigid and the studs themselves move relatively in the front and rear plates. 10 shows the meat plate which has integral therewith the rear plate 40. The plate 10 is provided with the usual ears 11 with apertures 12 to engage posts on the machine. The apertures are shown as being round in Fig. 4, but square apertures may be used, if the posts are of square cross section. Plates 10 and 40 are bored with a number of holes to form bearing supports for carrying the studs 41. Collars 42 are pinned to the studs and these collars are integral with pinions 43 which mesh with one another as shown in Fig. 5. One stud 41ª is extended a considerable distance beyond plate 40, and carries a knurled knob 47. By turning this knob the carrying studs will be rotated. It will be understood that row 1 and 2 of the studs will rotate in opposite directions. The front of the stud (toward plate 10) is cut away to form a spiral tang 44 which finally terminates at a sharp point 45. The tangs in row 1 are left hand spirals and those in row 2 are right spirals. They are cut in this manner on account of the opposite direction of rotation of the studs in rows 1 and 2 and this arrangement grips the meat or bacon in a more secure manner than if the direction of rotation was the same with all the tangs.

To advance and retract the tangs with respect to the meat plate with this construction, I employ a number of pins 46 which project upward from the bottom of plate 10 and engage the spiral slots formed in the stud 41 by the adjoining convolutions of the tangs 44. These pins 46 therefore being held in fixed position, cause the tangs 44, the studs 41 and pinions 43 and collars 42 to move relatively to the fixed plate 10 when the knurled knob 47 is turned. It will be understood that when the parts are in normal position that the points 45 of the tangs 44 are below the surface of the plate 10. This prevents accidents in placing the last slice holder in position. In Fig. 4 the parts are shown in moved or advanced position, *i. e.*, in the position they assume after the meat is secured to the tangs.

It is to be understood that various modifications will occur to those skilled in the art, and what I claim as my invention is particularly pointed out in the appended claims.

What I claim is:

1. In a device of the class described, in combination, a plurality of carrying studs each of the said studs carrying a centrally open spiral tang, means for rotating the studs and the tangs, and means independent of said tangs for advancing the said studs and tangs, the said advancing and turning movement of the tangs being adapted to engage the tangs in a piece of meat.

2. A last slice holder, including, in combination, a plurality of carrying studs, each of said studs carrying a spiral tang, means for rotating the studs and the tangs thereon, an apertured plate adjacent the points of said tangs and means for advancing said tangs and retracting them to a position in which the points of the tangs are below the surface of the apertured plate whereby accidental contact with the points of the tangs is prevented.

3. A last slice holder, including, in combination, a plurality of carrying studs, supporting plates therefor, a plurality of spiral tangs, secured to said studs, and means for rotating the studs and tangs, said means being adapted to cause relative movement of the tangs and studs with respect to one supporting plate and unison movement of the tangs and studs with the other supporting plate, whereby the tangs are advanced outwardly and engage the meat.

4. A last slice holder, comprising, in combination, a meat plate, a plurality of studs carrying tangs, supported thereon, and normally positioned with the points of the tangs below the surface of the meat plate; and means for concurrently rotating and advancing the studs, whereby the tangs are rotated and advanced beyond the meat plate to engage meat and hold said meat securely to the face of the meat plate.

5. A last slice holder, comprising, in combination, a meat plate, a plurality of studs, journaled at one end in the meat plate, said studs each having a spiral slot in its periphery, spiral tangs engaged in the said slots in the studs, and turning means to turn and axially advance the studs in their journals in the meat plate and to concurrently turn and advance the spiral tangs carried thereby.

6. In a device of the class described, in combination, a plurality of plates, a plurality of studs supported thereon, each of said studs having tangs thereon, means for rotating said studs and tangs, means for advancing one of the aforesaid plates, whereby the studs and tangs are advanced with respect to the other supporting plate.

7. In a device of the class described, in combination, a plurality of plates, one of said plates forming a meat plate, a second of said plates forming a carrying plate and being adapted to move relatively to the meat plate, a plurality of tang carrying studs supported by both of the aforesaid plates, and movable through the meat plate upon the movement of the carrying plate, and means for advancing the carrying plate and concurrently turning the tang carrying studs whereby the studs and the tangs are advanced and rotated.

8. In a device of the class described, in combination, a plurality of plates, one of said plates forming a meat plate, a second of said plates forming a carrying plate and being adapted to move relatively to the meat plate, a plurality of tang carrying studs supported by both of the aforesaid plates, and movable through the meat plate upon the movement of the carrying plate, means for advancing the carrying plate and thereby advancing the studs and the tangs, and means for turning the studs and thereby turning the tangs.

9. A last slice holder comprising, in combination, a plurality of carrying studs, each of said studs carrying a spiral tang and a pinion, means comprising racks meshing with the pinions for rotating the studs and the tangs thereon, and means operable by the racks and coöperating mechanism independent of the tangs for advancing the studs and tangs concurrently with the turning thereof.

10. In a device of the class described, a meat plate, a carrying plate, a plurality of tang carrying studs carried by and movable with the carrying plate, the said meat plate having a plurality of apertures for supporting the ends of the studs, each of the aforesaid studs having a pinion thereon, racks meshing with the aforesaid pinions, and means for moving the racks and turning the said pinions and tang carrying studs.

11. In a device of the class described, in combination, a meat plate, a carrying plate, a plurality of tang carrying studs carried by and movable with the carrying plate, the said meat plate having a plurality of apertures for supporting the ends of the studs, each of the aforesaid studs having a pinion thereon, racks meshing with the aforesaid pinions, means in operative association with the racks for advancing the carrying plate, and moving the studs through the apertures in the meat plate, and means for moving the racks and turning the said pinions and tang carrying studs.

12. In a device of the class described, in combination, a meat plate, a plurality of tang carrying studs, each of said studs having a pinion thereon for turning the stud, means for turning said pinions and the said studs, and means in operative association with the meat plate whereby the turning of said pinions advances the studs with respect to the meat plate.

13. In a device of the class described, a meat plate having a plurality of apertures therein, a plurality of tang carrying studs having pinions thereon, means for turning the pinions and the studs, and means in operative association with the meat plate, whereby the turning of said pinions advances the studs through the apertures in the meat plate and thereby engages the tangs on the studs with the meat and secures the meat to the meat plate.

14. A last slice holder including, in combination, a plurality of carrying studs arranged in a plurality of rows, each of said studs carrying a spiral tang, means for advancing the studs and tangs and means for concurrently rotating adjacent rows of studs and tangs in opposite directions to engage the tangs securely in the meat.

15. In a last slice holder, in combination, a supporting surface, a series of spiral meat engaging tangs, means for axially advancing the points of the tangs with respect to the supporting surface, and means for rotating the tangs in different directions to engage the meat.

16. In a last slice holder, in combination, a meat supporting plate, means for drawing meat toward and clamping it against the supporting plate comprising a series of centrally open spiral tangs, and means for concurrently rotating them and axially advancing the tangs with respect to the meat plate to cause them to penetrate the meat and clamp it against the support.

17. A last slice holder comprising, in combination, a meat holding surface, a plurality of tang carrying means, said means being disposed in a column, pinions associated with the said tang carrying means, a rack meshing with the said pinions, means for advancing and retracting the rack to thereby turn the tang carrying means and advance or retract the tangs into or out of the meat disposed adjacent the meat holding surface.

18. A last slice holder comprising, in combination, a meat holding surface, a plurality of tang carrying means, said means being disposed in parallel columns, pinions associated with the said tang carrying means, a rack meshing with the pinions in each of the said columns, and means for advancing and retracting the rack, whereby the tang carrying means are rotated to thereby advance or retract the tangs into or out of the meat disposed adjacent the meat holding surface.

19. A last slice holder for slicing machines comprising, in combination, a meat holding surface, a series of spiral rotatively mounted meat holding tangs, arranged in a plurality of parallel separate columns, pinions associated therewith, racks intermeshing with the pinions, each rack meshing with the pinions of a plurality of the columns, and a common operating means for all of the said racks to advance and retract the same, whereby the spiral tangs are rotated into or out of the meat which is disposed adjacent the meat holding surface.

20. In a last slice holder, in combination, a meat plate, a series of gears arranged on one side of the plate and having spiral meat engaging tangs to rotate in unison therewith, said tangs projecting through apertures in the plate, a rack meshing with the said gears, and means for reciprocating said rack to rotate the spiral tangs and thereby engage or disengage said tangs and the meat.

21. In a last slice holder, in combination, a meat plate having a plurality of apertures therein, a plurality of gears coaxially disposed with respect to the said apertures, spiral meat engaging tangs adapted to rotate in unison with the said gears and extending axially in the said apertures, the aforesaid gears being disposed in parallel columns, and a rack to mesh with gears in both columns to rotate the same, and means for reciprocating the said rack.

22. In a last slice holder, in combination, a meat plate, spiral meat tangs in coöperative relation to said plate, said tangs having gears associated therewith for rotating the same, a rack in mesh with the said gears, and means for reciprocating the rack.

23. A last slice holder comprising, in combination, a meat plate, a series of gears extending in alinement across the said plate at one side thereof, spiral meat engaging tangs adapted to rotate in unison with said gears, a rack extending across and meshing with the said row of gears for rotating the same, and means for reciprocating the rack, whereby the spiral tangs are rotated and are engaged or disengaged from the meat disposed adjacent the meat plate.

24. A last slice holder comprising, in combination, a meat plate, a series of gears extending in alinement across the meat plate at one side thereof, a second series of gears extending parallel to the aforesaid series, series of spiral meat engaging tangs adapted to rotate in unison with the said series of gears, one series of said tangs having left hand spirals and the other series having right hand spirals, a rack member having teeth meshing with the first mentioned series of gears, means for reciprocating the rack and means for rotating the second series of gears concurrently with the first series but in reverse direction, whereby the tangs in one series are reversely rotated with respect to those in the other series.

25. In a last slice holder, a spiral meat engaging tang and mounting therefor, comprising, in combination, a stud having a spiral slot in its periphery; a spiral tang threaded into the said slot and having its outer periphery substantially flush with the periphery of the stud; and means associated with the stud for securing the spiral tang in position in the spiral slot.

In testimony whereof I hereunto affix my signature.

JOSEPH HOPKINSON.